(12) United States Patent
Hetmaniok

(10) Patent No.: US 12,523,286 B2
(45) Date of Patent: Jan. 13, 2026

(54) TRANSMISSION SERIES

(71) Applicant: ZF Friedrichshafen AG, Friedrichshafen (DE)

(72) Inventor: Simon Hetmaniok, Witten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 403 days.

(21) Appl. No.: 17/905,230

(22) PCT Filed: Mar. 1, 2021

(86) PCT No.: PCT/EP2021/054972
§ 371 (c)(1),
(2) Date: Aug. 29, 2022

(87) PCT Pub. No.: WO2021/197725
PCT Pub. Date: Oct. 7, 2021

(65) Prior Publication Data
US 2023/0144383 A1 May 11, 2023

(30) Foreign Application Priority Data
Mar. 31, 2020 (DE) .......... 10 2020 204 202

(51) Int. Cl.
*F16H 57/033* (2012.01)
*F16C 35/04* (2006.01)
*F16C 19/54* (2006.01)

(52) U.S. Cl.
CPC ......... *F16H 57/033* (2013.01); *F16C 35/042* (2013.01); *F16C 19/548* (2013.01)

(58) Field of Classification Search
CPC ..... F16H 57/033; F16C 35/042; F16C 19/548
(Continued)

(56) References Cited

U.S. PATENT DOCUMENTS 4,473,129 A * 9/1984 Guimbretiere ........ F16C 35/063
464/178
5,682,799 A 11/1997 Dimov
(Continued)

FOREIGN PATENT DOCUMENTS

CN 101080579 A 11/2007
CN 201521554 U 7/2010
(Continued)

OTHER PUBLICATIONS

Selection of FAG bearing arrangement, Nodes Technology Co., Hong Kong, retrieved from the internet 20250102 at <https: www.nodeshk.com>. (Year: 2016).*
(Continued)

*Primary Examiner* — Greg Binda
(74) *Attorney, Agent, or Firm* — Finch & Maloney PLLC

(57) ABSTRACT

A transmission series has a first transmission and a second transmission. The first transmission and the second transmission each have a respective input shaft, a housing, a supporting structure fixed in the housing, and at least two bearings by means of which the input shaft is mounted rotatably in the respective supporting structure. The at least two bearings of the first transmission are of the same first design and the at least two bearings of the second transmission are of the same second design that is different from the first design. The supporting structures of the first and second transmissions are designed identically.

14 Claims, 2 Drawing Sheets

(58) Field of Classification Search
USPC .......................................................... 464/178
See application file for complete search history.

(56) References Cited

U.S. PATENT DOCUMENTS

| | | | |
|---|---|---|---|
| 5,953,964 | A | 9/1999 | Cognigni et al. |
| 7,287,911 | B2 | 10/2007 | Dodoro et al. |
| 7,771,127 | B2 | 8/2010 | Smook et al. |
| 9,157,507 | B2 * | 10/2015 | Zimmermann ....... F16H 57/025 |
| 9,377,296 | B2 | 6/2016 | Fäs et al. |
| 10,371,201 | B2 | 8/2019 | Pont |
| 10,871,216 | B2 | 12/2020 | Tegeltija et al. |
| 11,192,399 | B2 * | 12/2021 | Parikh ................. F16C 33/7886 |
| 2011/0033299 | A1 | 2/2011 | Leimann et al. |
| 2014/0314599 | A1 | 10/2014 | Manninen |
| 2020/0096042 | A1 | 3/2020 | Zhong |

FOREIGN PATENT DOCUMENTS

| | | |
|---|---|---|
| CN | 102011858 A | 4/2011 |
| CN | 104011503 A | 8/2014 |
| CN | 104246305 A | 12/2014 |
| CN | 104295504 A | 1/2015 |
| CN | 108138842 A | 6/2018 |
| DE | 697 13 187 T2 | 2/2003 |
| DE | 10 2011 007 494 B4 | 12/2012 |
| DE | 10 2014 209 639 A1 | 11/2015 |
| DE | 10 2015 207 163 A1 | 10/2016 |
| DE | 10 2018 102 817 A1 | 8/2019 |
| DE | 694 26 448 T2 | 8/2021 |
| JP | 2002-372054 A | 12/2002 |
| WO | 2003/040578 A1 | 5/2003 |

OTHER PUBLICATIONS

European Patent Office, International Search Report issued in International patent application No. PCT/EP2021/054972 (May 18, 2021).

China Patent Office, Chinese Office Action issued in Chinese Patent application No. 02180016762.9 (Mar. 14, 2025).

* cited by examiner

TRANSMISSION SERIES

RELATED APPLICATIONS

This application claims the benefit under 35 U.S.C. § 371 as a U.S. National Phase Application of application no. PCT/EP2021/054972, filed on Mar. 1, 2021, which claims benefit of German Patent Application no. 10 2020 204 202.0 filed Mar. 31, 2020, the contents of which are hereby incorporated herein by reference in their entireties.

FIELD OF THE DISCLOSURE

The present disclosure relates generally to transmissions and more particularly to a transmission series.

BACKGROUND

In the case of transmissions manufactured in small production runs, the housing is designed in a customer-specific manner. For example, perhaps the mounting of the input shaft must be adapted to the load that is to be supported. From this, various types of input shaft mountings follow. In turn, the various types of mounting require a different design of the transmission housing. This increases production costs.

SUMMARY

The purpose of the present invention is to reduce the production costs of transmissions. That objective is achieved by a transmission series according to the present disclosure. Example embodiments are described below and are illustrated in the figures.

A transmission series is a group of at least two transmissions which match one another in relation to the form of at least one technical feature. The at least two transmissions form an arrangement.

A first transmission and a second transmission of the transmission series according to the invention each comprise an input shaft, a housing, a supporting structure, and at least two and preferably exactly two bearings by which the input shaft is mounted in the supporting structure.

An input shaft is a shaft designed to be acted upon by an input torque. At least part of the input shaft is outside the housing. This part is acted upon by the input torque.

A supporting structure is a means designed to receive and pass on forces. The supporting structures of the first housing and the second housing are in each case fixed in their respective housings. Preferably, the fixing of the said supporting structures in their housing is solid, that is, without the possibility of relative movement between the supporting structure and the housing. The supporting structure is designed to absorb holding forces transmitted into it by the at least two bearings and pass them on into the transmission housing.

Preferably, the supporting structures form part of the housing in each case. This means that the supporting structure, together with the housing of the transmission concerned, encapsulates a hollow space—the inside of the transmission. The at least two bearings are preferably arranged inside of that hollow space.

The at least two bearings of the first transmission are of identical design as one another. Likewise, the at least two bearings of the second transmission are of identical design as one another. Bearings of identical design belong to a group of bearings with the same design of one or more technical features. Thus, all the bearings in this group have certain technical features which are of the same design in all the bearings of the group. For example, axial bearings, radial bearings, axial-radial bearings, roller bearings, ball bearings, conical roller bearings, needle bearings, spherical roller bearings, and slide bearings in each case form such a group. The at least two bearings of the first transmission might be ball bearings and the at least two bearings of the second transmission might be conical roller bearings.

According to the invention, the design of the at least two bearings of the first transmission is different from the design of the at least two bearings of the second transmission. The at least two bearings of the first transmission and the at least two bearings of the second transmission are thus of different design.

A first design and a second design of bearings are different when there is at least one technically differentiating feature between them. In this context a technical feature is understood to be one whose expression in the bearings of the first design and the bearings of the second design is the same in each case, and whose expression in the bearings of the first design differs from its expression in the bearings of the second design. For example, axial bearings and radial bearings are different. Likewise, slide bearings and roller bearings are bearings of different design. Ball bearings, conical roller bearings, needle bearings, spherical roller bearings, and slide bearings are designs that differ from one another in pairs.

The supporting structure of the first transmission and the supporting structure of the second transmission are of the same design. Two components are of the same design if their physical parameters—particularly in relation to their materials and geometrical properties—are the same to within the relevant manufacturing tolerances.

Supporting structures of the same design are advantageous since they have cost advantages due to scale effects. This is more so the case when castings of complex structure are used as supporting structures. By virtue of the various designs of the bearings, the individual transmissions of the model series according to the invention can be adapted to suit the load situations of individual customers.

According to a preferred further development, bearings of various designs can be used with input shafts which are not of the same design. This means that in accordance with the said further development, the input shaft of the first transmission and the input shaft of the second transmission are not of the same design. Thus, the input shaft of the first transmission and the input shaft of the second transmission differ in at least one physical parameter in such manner that the difference is no longer within the range of the manufacturing tolerances concerned. In particular, the input shaft of the first transmission and the input shaft of the second transmission can differ in their respective component geometries.

This further development stems from the notion that adaptations to suit customer-specific circumstances should be made in inexpensive components. Thus, input shafts are usually lathe-turned components which, compared with cast components, can be produced more cheaply.

In a preferred further development, the at least two bearings of the first transmission are configured in an X-arrangement and the at least two bearings of the second transmission are configured in an O-arrangement. This implies that the bearings are axial-radial bearings.

In another preferred further development, the first transmission and the second transmission each have a cover. A cover is a means for covering or closing off an opening.

The cover is fixed in the respective supporting structure and thereby closes an opening of the supporting structure concerned. The cover of the first transmission is fixed in the supporting structure of the first transmission. This fixing is preferably solid, i.e. such that no relative movement is possible between the supporting structure and the cover concerned. Preferably, a seal is arranged between the supporting structures and the respective cover, which seals the supporting structure in an oil-tight manner against the cover concerned.

In each case the input shaft extends through the cover. Thus, the input shaft of the first transmission passes through the cover of the first transmission, while the input shaft of the second transmission passes through the cover of the second transmission. This implies that each cover has an opening through which the input shaft extends. Accordingly, at least part of each input shaft is inside its respective transmission. The part of the input shafts inside their respective transmissions and the part on the outside are arranged on opposite sides of the cover concerned.

The cover of the first transmission and the cover of the second transmission are structurally the same. This results in further scale effects thanks to which cost savings can be made.

The cover of the first transmission is preferably developed further in that it axially supports an outer ring of a first of the two bearings of the first transmission, i.e. parallel to a rotation axis of the input shaft. Thus, the cover forms an axial abutment for the outer ring of the first bearing. Preferably, the said cover supports the outer ring of the first bearing against any displacement toward the outside of the first transmission.

The supporting structure of the second transmission is preferably further developed with a step which axially supports an outer ring of a first of the at least two bearings of the second transmission. Thus, the supporting structure of the second transmission forms an axial abutment for the outer ring of the second bearing. The outer ring of the second bearing is preferably supported toward the inside of the second transmission.

A step is a circular part of the surface of a component which extends between two rotationally symmetrical edges of the component and connects them to one another. These edges form the circular boundary lines of the circular ring.

Since the supporting structures of the first and second transmissions are of identical design, according to this further development, the supporting structure of the first transmission also has a step. This can have no function and, in particular, forms no abutment for an outer ring of one of the two bearings of the first transmission.

The input shaft of the first transmission is preferably developed further with a step, which axially supports an inner ring of the first bearing of the first transmission. Thus, the step forms an axial abutment for the inner ring of the first bearing of the first transmission. Preferably, the step supports the inner ring toward the outside of the first transmission.

The input shaft of the second transmission preferably has no corresponding step, but rather, is further developed by a screwed-on adjusting nut. This forms an abutment for an inner ring of the first bearing of the second transmission. Thus, the adjusting nut supports the inner ring in the axial direction. Preferably, the adjusting screw supports the inner ring toward the inside of the second transmission. Thus, the support given by the step on the input shaft of the first transmission and the support given by the adjusting screw of the input shaft of the second transmission preferably act in opposite directions.

In a preferred further development, the supporting structure of the first transmission has a groove. This groove is preferably rotationally symmetrical. Into the groove is set a locking ring which forms an axial abutment for an outer ring of a second of the at least two bearings of the first transmission. The locking ring supports the outer ring in the axial direction. Preferably, the locking ring supports the outer ring toward the inside of the first transmission.

Since the supporting structures of the first and second transmissions are designed identically, the supporting structure of the second transmission also has a rotationally symmetrical groove. This can have no function and can correspondingly remain without an inset locking ring.

Preferably, the supporting structure of the second transmission is further developed with a step, which serves as an abutment for an outer ring of a second of the at least two bearings of the second transmission. The said step supports the outer ring in the axial direction. Preferably, the outer ring is supported toward the outside of the second transmission.

Since the supporting structures of the first and second transmissions are designed identically, the supporting structure of the first transmission has a corresponding step. This can have no function or can form an abutment for the outer ring of the second bearing of the first transmission.

In other preferred further developments, the input shafts of the first transmission and/or the second transmission each form a step. The steps support the respective inner rings of the second bearing of the transmission concerned in the axial direction. Thus, they form an axial abutment for the inner ring concerned.

Preferably, the supporting function by the steps of the input shafts acts in opposite directions. Thus, the step on the input shaft of the first transmission preferably supports the inner ring of the second bearing of the first transmission toward the outside of the first transmission, whereas the step on the input shaft of the second transmission supports the inner ring of the second bearing of the second transmission toward the inside of the second transmission.

BRIEF DESCRIPTION OF THE DRAWINGS

A preferred embodiment of the invention is shown in FIGS. 1 and 2. In detail.

DETAILED DESCRIPTION

Figure 1:
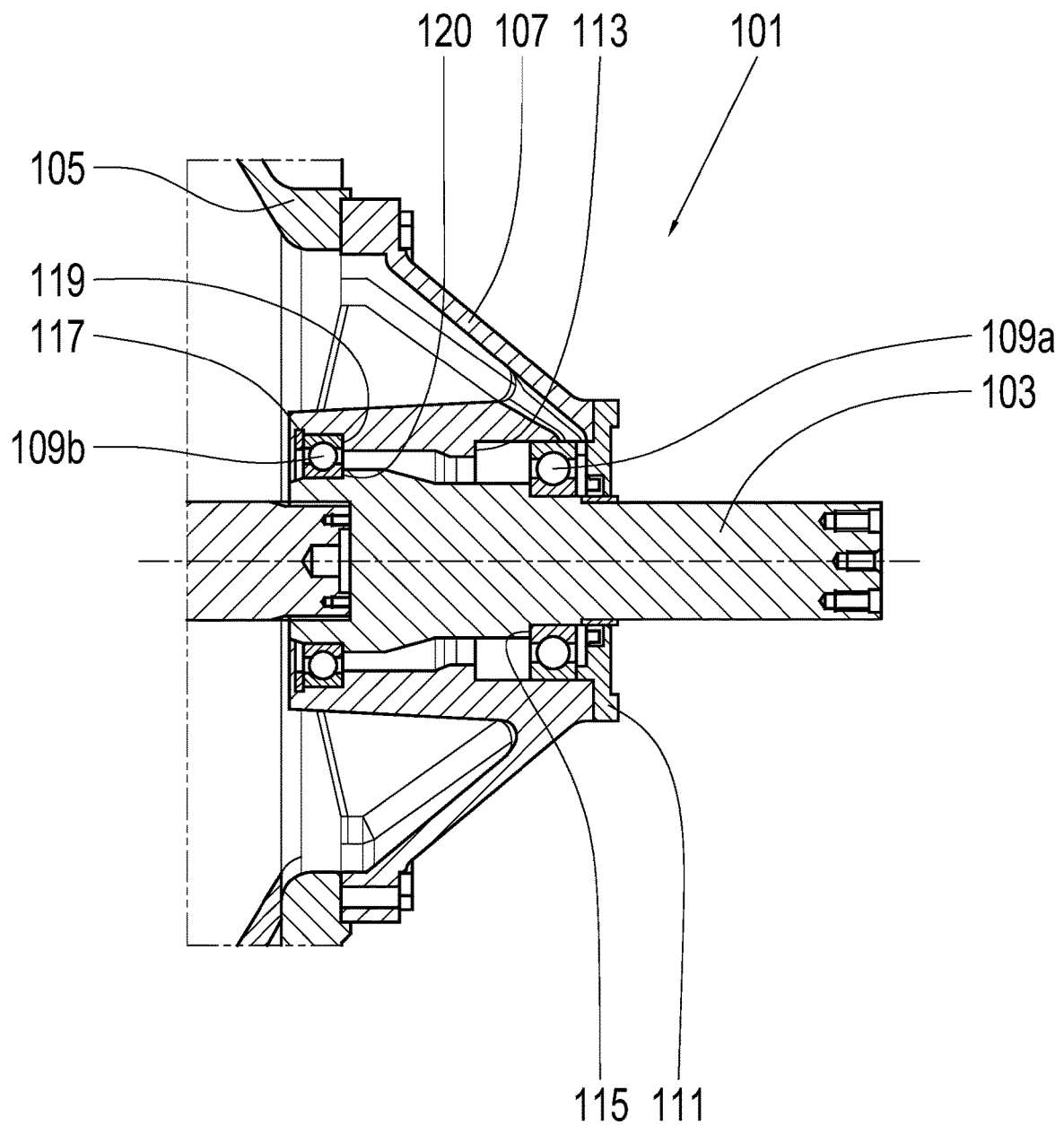
FIG. 1 shows a first transmission of a transmission series.
Figure 2:
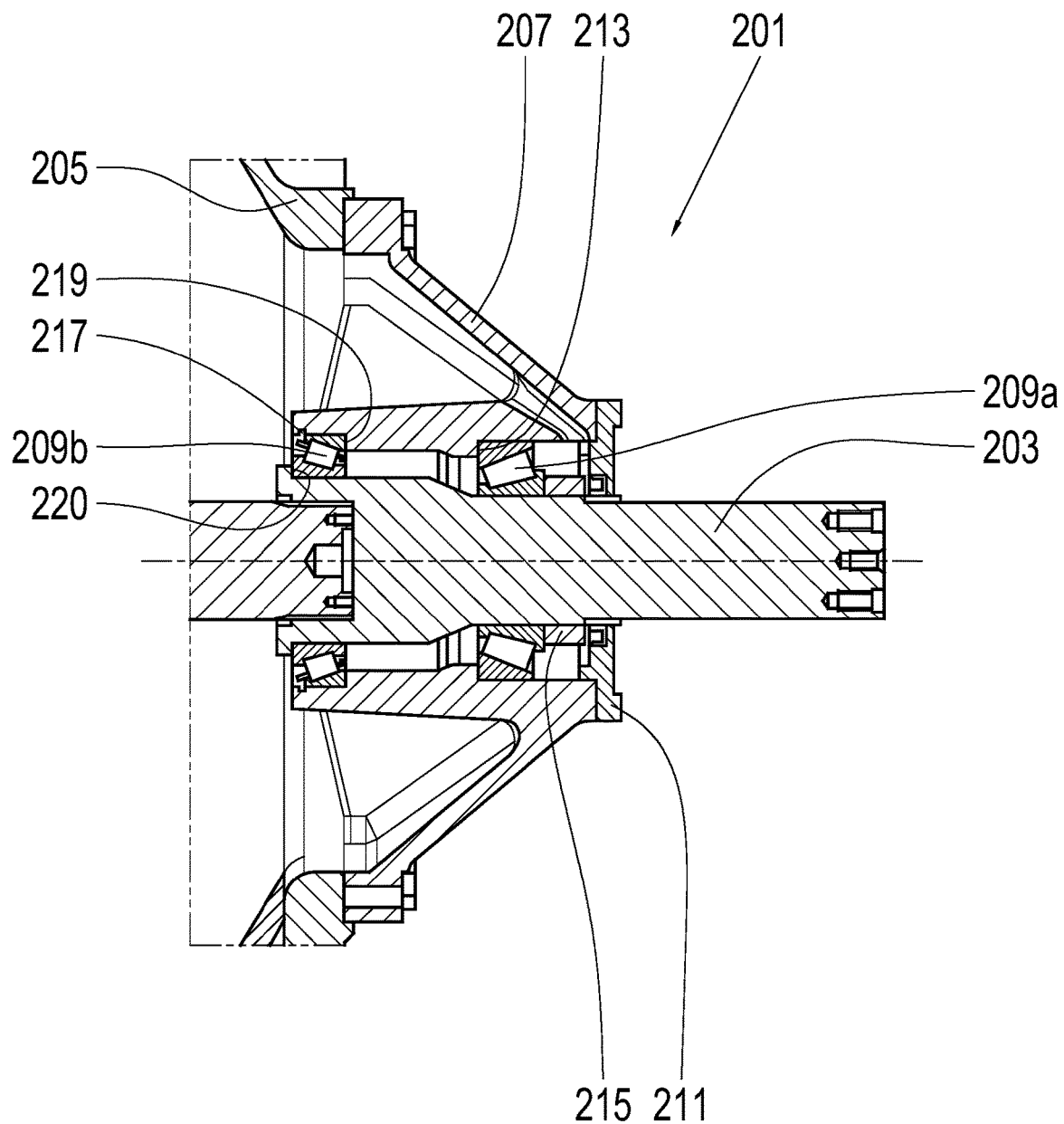
FIG. 2 shows a second transmission of the transmission series.

The first transmission 101 shown in FIG. 1 and the second transmission 201 shown in FIG. 2 belong to a common model series. The transmissions 101, 201 each have an input shaft 103, 203. A housing 105 of the first transmission 101 and a housing 205 of the second transmission 201 are of identical design. The housings 105, 205 each form an opening onto which a supporting structure 107, 207 is bolted. The supporting structure 107 of the first transmission 101 and the supporting structure 207 of the second transmission 201 are of identical design.

The input shaft 103 of the first transmission 101 is mounted rotatably in the supporting structure 107 of the first transmission 101 by means of a first ball bearing 109a and a second ball bearing 109b. Analogously, the input shaft 203 of the second transmission 201 is mounted rotatably in the supporting structure 207 of the second transmission 201 by means of a first conical roller bearing 209a and a second conical roller bearing 209b.

To the supporting structures 107, 207 a cover 111, 211 is bolted in each respective case. The respective input shafts 103, 203 extend through central openings in the covers 111, 211. The cover 111 of the first transmission 101, and likewise the cover 211 of the second transmission 201, is sealed relative to the respective input shaft 103, 203 so that no oil can escape between the said covers 111, 211 and the input shafts 103, 203.

The supporting structure 107 of the first transmission 101 and the supporting structure 207 of the second transmission 201 are in each case provided with a first step 113, 213. The first step 213 of the supporting structure 207 of the second transmission 201 forms an axial abutment for an outer ring of the first conical roller bearing 209a. The said first step 213 supports the outer ring toward the inside of the transmission. The input shaft 203 of the second transmission preferably has no corresponding step, but rather, is further developed by a screwed-on adjusting nut 215. The adjusting nut 215 forms an abutment for an inner ring of the first bearing 209a of the second transmission 201. Thus, the adjusting nut 215 supports the inner ring in the axial direction.

The first step 113 of the supporting structure 107 of the first transmission 101 has no function.

The input shaft 103 of the first transmission 101 is provided with a first step 115 as an abutment for an inner ring of the first ball bearing 109a. It supports the said inner ring toward the inside of the transmission.

The cover 111 of the first transmission 101 forms an abutment for an outer ring of the first ball bearing 109a. The outer ring is supported by the cover 111 toward the inside of the transmission. Since the covers 111, 211 of the first and second transmissions 101, 201 are of identical design, the cover 211 of the second transmission 201 forms a corresponding abutment. However, this has no function.

An outer ring of the second ball bearing 109b is supported toward the inside of the transmission. For that purpose, the supporting structure 107 of the first transmission 101 is provided with a groove 117 into which a locking ring is set. This forms an abutment for the support of the outer ring of the second ball bearing 109b.

Since the respective supporting structures 107, 207 of the first and second transmissions 101, 201 are of identical design, the supporting structure 207 of the second transmission 201 has a corresponding groove 217. However, this has no function and therefore remains empty.

A second step 119 of the supporting structure 107 of the first transmission 101 forms another abutment for the outer ring of the second ball bearing 109b. In that way the outer ring of the second ball bearing 109b is supported toward the outside of the transmission. The outer ring of the second ball bearing 109b is between the locking ring set into the groove 117 and the second step 119 of the supporting structure 107 of the first transmission 101.

Since the supporting structures 107, 207 of the first transmission 101 and the second transmission 201 are of identical design, the supporting structure 207 of the second transmission 201 also has a second step 219. Analogously, this forms an abutment for an outer ring of the second conical roller bearing 209b. In that way the outer ring of the second conical roller bearing 209b is supported toward the outside of the transmission.

The input shafts 103, 203 of the transmission 101 and the second transmission 201 are in each case provided with a step 120, 220 as abutments for an inner ring of the second ball bearing 109b or the second conical roller bearing 209b respectively. A second step 120 of the input shaft 103 of the first transmission 101 serves as an abutment for an inner ring of the second ball bearing 109b and supports it toward the outside of the transmission. Analogously, a step 220 of the input shaft 203 of the second transmission 201 forms an abutment for an inner ring of the second conical roller bearing 209b. However, the inner ring of the second conical roller bearing 209b is supported by the second step 220 in the opposite direction, i.e. toward the inside of the transmission.

By virtue of the arrangement of the abutments described, the first ball bearing 109a and the second ball bearing 109b are configured in an X-arrangement. The first conical roller bearing 209a and the second conical roller bearing 209b form an arrangement in an O-configuration.

INDEXES

101 First transmission
103 Input shaft
105 Housing
107 Supporting structure
109a First ball bearing
109b Second ball bearing
111 Cover
113 First step of the supporting structure
115 First step of the input shaft
117 Groove
119 Second step of the supporting structure
120 Second step of the input shaft
201 Second transmission
203 Input shaft
205 Housing
207 Supporting structure
209a First conical roller bearing
209b Second conical roller bearing
211 Cover
213 First step of the supporting structure
215 Adjusting nut
217 Groove
219 Second step of the supporting structure
220 Step of the input shaft

The invention claimed is:

1. A transmission series comprising:
a first transmission and a second transmission, wherein the first transmission and the second transmission each have a respective input shaft, a housing, a supporting structure fixed in the housing, and at least two bearings by means of which the input shaft is mounted rotatably in the supporting structure;
wherein each of the at least two bearings of the first transmission are of a first design;
wherein each of the at least two bearings of the second transmission are of a second design different from the first design; and
wherein the supporting structure of the first transmission and the supporting structure of the second transmission are of identical design; and
wherein the at least two bearings of the first transmission are configured as roller bearings inclined to the input shaft in an X-arrangement and the at least two bearings of the second transmission are configured as ball bearings in an O-arrangement.

2. The transmission series according to claim 1, wherein the input shaft of the first transmission is of a different design compared to the input shaft of the second transmission.

3. The transmission series according to claim 1, wherein the first transmission and the second transmission each have a respective cover which is fixed in the respective supporting structure and through which the respective input shaft extends, wherein the cover of the first transmission and the cover of the second transmission are of identical design.

4. The transmission series according to claim 3, wherein the cover of the first transmission axially supports an outer ring of a first bearing of the first transmission.

5. The transmission series according to claim 1, wherein the supporting structure of the second transmission defines a step which axially supports an outer ring of a first bearing of the second transmission.

6. The transmission series according to claim 1, wherein the input shaft of the first transmission defines a step which axially supports an inner ring of a first bearing of the at least two bearings of the first transmission.

7. The transmission series according to claim 6, further comprising an adjusting nut screwed onto the input shaft of the second transmission, the adjusting nut axially supporting an inner ring of a first bearing of the at least two bearings of the second transmission.

8. The transmission series according to claim 7, further comprising a locking ring, wherein the supporting structure of the first transmission defines a groove wherein the locking ring is set in the groove such that the locking ring axially supports an outer ring of a second bearing of the at least two bearings of the first transmission.

9. The transmission series according to claim 1, further comprising an adjusting nut screwed onto the input shaft of the second transmission, the adjusting nut axially supporting an inner ring of a first bearing of the at least two bearings of the second transmission.

10. The transmission series according to claim 1, further comprising a locking ring, wherein the supporting structure of the first transmission defines a groove wherein the locking ring is set in the groove such that the locking ring axially supports an outer ring of a second bearing of the at least two bearings of the first transmission.

11. The transmission series according to claim 1, wherein the supporting structure of the second transmission defines a step which axially supports an outer ring of a second bearing of the at least two bearings of the second transmission.

12. The transmission series according to claim 1, wherein the input shaft of the first transmission defines a step which axially supports an inner ring of a second bearing of the at least two bearings of the first transmission.

13. The transmission series according to claim 1, wherein the input shaft of the second transmission defines a step which axially supports an inner ring of a second bearing of the at least two bearings of the second transmission.

14. A transmission series comprising:
a first transmission and a second transmission, wherein the first transmission and the second transmission each have a respective input shaft, a housing, a supporting structure fixed in the housing, and at least two bearings by means of which the input shaft is mounted rotatably in the supporting structure;
wherein each of the at least two bearings of the first transmission are configured as ball bearings;
wherein each of the at least two bearings of the second transmission are configured as roller bearings that are inclined to the input shaft; and
wherein the supporting structure of the first transmission and the supporting structure of the second transmission are of identical design; and
wherein the roller bearings of the first transmission are inclined with respect to the input shaft in an X-arrangement, and wherein the roller bearings of the second transmission are arranged in an O-arrangement.

* * * * *